United States Patent [19]

Kawasaki

[11] 4,424,877
[45] Jan. 10, 1984

[54] OSCILLATING LINK MECHANISM FOR THREE-WHEELED MOTOR VEHICLES

[75] Inventor: Katsuyoshi Kawasaki, Mitaka, Japan

[73] Assignee: Honda Giken Kogyo Kabushiki Kaisha, Tokyo, Japan

[21] Appl. No.: 341,367

[22] Filed: Jan. 21, 1982

[30] Foreign Application Priority Data

Jan. 26, 1981 [JP] Japan ............................ 56-10120[U]

[51] Int. Cl.³ .......................... B62K 5/04; B62K 11/02
[52] U.S. Cl. ..................................... 180/210; 180/227; 180/228; 248/613; 248/634; 280/282
[58] Field of Search ............... 280/210, 209, 220, 282, 280/281 R, 285, 286; 180/210, 227, 228; 248/589, 609, 613, 634; 267/57, 57.1 A, 63 A, 21 A

[56] References Cited

U.S. PATENT DOCUMENTS

| 3,504,881 | 4/1970 | Pillons et al. ................. 248/609 X |
| 3,966,006 | 6/1976 | Cullinan ........................... 267/57 X |
| 4,324,306 | 4/1982 | Ishihara et al. ..................... 180/228 |
| 4,372,417 | 2/1983 | Yamamoto et al. ............ 180/228 X |
| 4,373,602 | 2/1983 | Tomita et al. ....................... 180/227 |

FOREIGN PATENT DOCUMENTS

| 2084525 | 4/1982 | United Kingdom ................ 180/228 |
| 2087324 | 5/1982 | United Kingdom ................ 280/282 |

Primary Examiner—Joseph F. Peters, Jr.
Assistant Examiner—Mitchell J. Hill
Attorney, Agent, or Firm—Sughrue, Mion, Zinn, Macpeak and Seas

[57] ABSTRACT

A position adjusting means of a link mechanism which hangingly supports a swing joint in three-wheeled motor vehicle having front body laterally swingable relative to a rear body. The position adjusting means includes a pair of flexible stops, one being positioned behind one end of a sleeve member which supports a pair of link members, and the other being positioned in front of the sleeve member. These stops are mounted onto a pair of frame members positioned in the front body and extending in parallel along travel direction of the vehicle, or mounted onto one of said frame members so as to position at least one end of said sleeve between the stops. The link members each have an upper end integrally connected to a supporting member and a stop is secured to the lower surface of each supporting member. The supporting members extend in horizontal plane and opposite direction relative to the sleeve along travel direction of the vehicle. The sleeve supports the pair of link members and is concentrically supported by a pivotal shaft through rubber bushes. The both ends of the pivotal shaft is secured by a pair of brackets mounted on the pair of frame members. Upon placement of the stops onto the frame members, the link members provide vertical orientation.

11 Claims, 8 Drawing Figures

OSCILLATING LINK MECHANISM FOR THREE-WHEELED MOTOR VEHICLES

BACKGROUND OF THE INVENTION

1. Field of the Invention

This invention relates to a position adjusting means of a link mechanism for supporting a swing joint, and more particularly, to such position adjusting means of a link mechanism which hangingly supports the swing joint for use in a three-wheeled motor vehicle.

2. Description of the Prior Art

In a swingable type three-wheeled motor vehicle or the like, a swing joint is pivotably supported on a vehicle frame by a link mechanism. In view of the counteraction of rear wheels and a shock absorbing unit associated with the swing joint, it is necessary, during assembly, to pivotally connect the link to the swing joint at the vertically hanging position of the link suspended from the vehicle frame. In this connection, it is known to provide an aligning notch in an inner sleeve of a rubber bush by which the link mechanism is supported on the frame, and provide a corresponding notch on a sleeve of the frame, so that the notches may be aligned with each other when the link mechanism is mounted on the frame. This method is, however, not satisfactory, since various parts to be connected together are very likely to possess their own dimensional deviations, and develop further deviations when they are put together. Moreover, this method is not efficient, since the work has to be done in a very narrow space.

SUMMARY OF THE INVENTION

It is therefore an object of the present invention to overcome the above-mentioned drawbacks and to provide an improved link position adjusting means.

Another object of the invention is to provide such means which precisely assemble a link mechanism at the predetermined position relative to vehicle frame and a swing joint.

Still another object of the invention is to provide such position adjusting means capable of minimizing troublesome position control, yet providing simplified structure.

These and other objects of this invention will be attained by providing a pair of link members integrally provided with stop means. The pair of link members are suspended from a pair of frame members of a vehicle extending in parallelism. A pair of brackets are mounted onto the frame members and a central pivot shaft is supported at its both ends by the brackets. A cylindrical sleeve is concentrically supported by the central shaft through rubber bushes and extend between the link members. In the preferred embodiment, one of the link members has an upper portion integrally provided with a supporting member positioned rearwardly from the one end of the sleeve and is mounted on the one of the frame members. The other link member has an upper portion integrally provided with a supporting member positioned frontwardly from the other end of the sleeve and is mounted on the other frame member. These supporting members have lower surface provided with stops formed of flexible material, so that the position of the link members is determined by mounting these stops onto the respective frame members to allow vertical orientation of the link members prior to the connection with a swing joint. These link members are pivotable along travel direction of the vehicle about the central pivot shaft within the deformable range of the rubber bushes and the flexible stops. In another embodiment, one of the link members is directly coupled to one end of the sleeve, and the other link member is provided with two supporting members at upper portion thereof, and the other ends of the sleeve is interposed between the supporting members along travel direction of the vehicle.

The device of this invention is simple in construction, and easily mounts or maintains the link mechanism in its corrected angular position on the vehicle frame, while compensating for any dimensional deviation of the parts involved, or any displacement thereof arising when the vehicle is driven.

These and other objects of this invention will become apparent from the description of the drawings and the preferred embodiments which follow.

BRIEF DESCRIPTION OF THE DRAWINGS

In the drawings;

FIG. 4 is a sectional view taken along the line VI—VI of FIG. 3a;

DETAILED DESCRIPTION OF THE INVENTION

Figure 1:
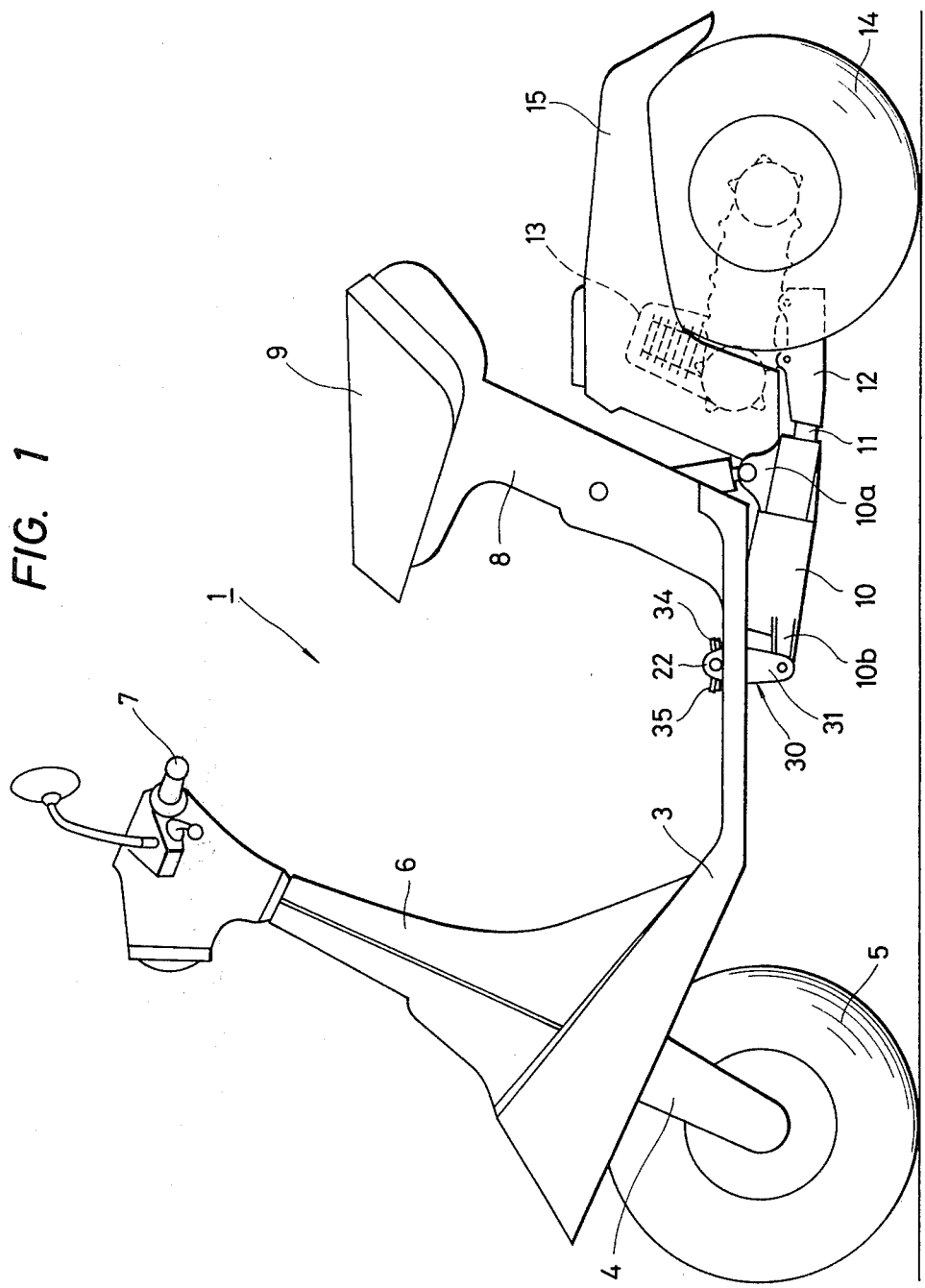
FIG. 1 is a side elevational view of a three-wheeled motor vehicle in which a device embodying this invention is employed.
Figure 2:
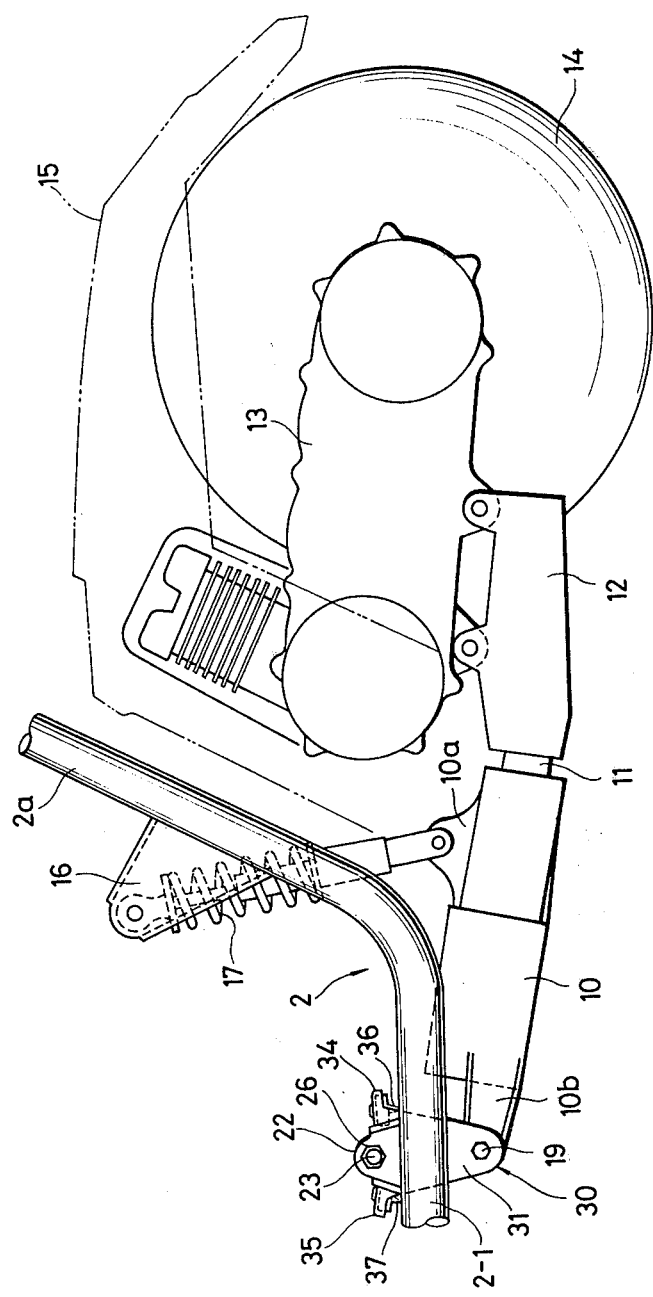
FIG. 2 is a fragmentary enlarged view particularly showing a link portion according to the invention.

Referring first to FIG. 1, there is shown a three-wheeled motor vehicle in which a device embodying this invention is employed. The three-wheeled motor vehicle 1 includes a longitudinally extending frame 2 (FIG. 2) covered with a cover 3 which defines foot steps and a front fender. A front fork 4 is provided at the front end of the frame 2, and carries a front wheel 5 thereon. A handle post cover 6 extends upwardly from the cover 3, and carries a handlebar 7 thereon. The front fork 4 is connected to the handlebar 7. The frame 2 has an upwardly bent rear portion surrounded by a seat post cover 8. A seat 9 is mounted at the top of the seat post.

A swing joint 10 is pivotally mounted at the bottom portion of the frame 2. A shaft 11 defining a rotary joint is rotatably associated with the swing joint 10 at its front end, and connected to a rear frame 12 at its rear end. A power unit 13 including an engine is mounted on the rear frame 12, and connected to a pair of rear wheels 14 (only one of which is shown in FIG. 1) to drive the same. A rear fender 15 is mounted over the rear wheels and covers the power unit 13. The rear wheels 14 drive the vehicle 1, while the front wheel 5 steers it. The swing joint 10 moves up and down to provide a shock absorbing action, and the front frame 2 swings from side to side about the joint 11 relative to the rear frame 12.

Figure 3A:
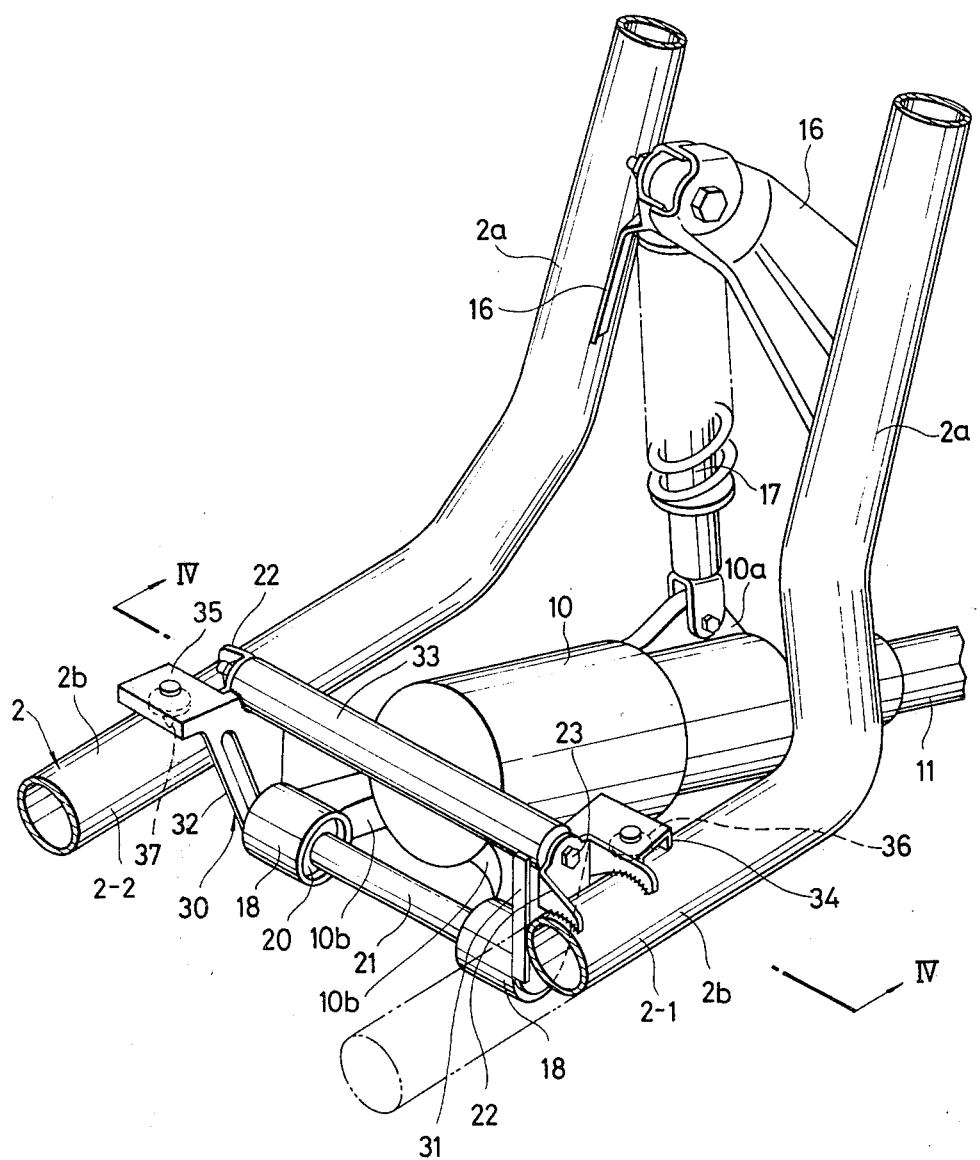
FIG. 3a is a fragmantary perspective view of FIG. 2.

The swing joint 10 has a front end pivotally supported to the frame 2 by a link means 30. The frame 2 comprises a pair of frame members 2-1 and 2-2 each formed from a pipe or the like, as shown in FIG. 3 or 4. These frame members extend in parallel with each other. Each of the frame members 2-1, 2-2 includes an upwardly bent rear portion 2a. A pair of brackets 16 extending frontwardly are secured to each rear portion 2a at the position intermediate height thereof, and the front ends of the brackets 16 pivotably support a top end of a rear cushion unit 17. The lower end of the rear cushion unit 17 is pivotably coupled to a lug 10a upwardly projecting from the rear end of the swing joint 10. A pair of arms 10b transversely project from the front end of the swing joint 10, and are each provided with an integral collar 18 at their free ends. Each of the frame members 2-1 and 2-2 includes a horizontal portion 2b. A pair of transversely spaced apart suspending link members 31 and 32 are provided adjacent to the inner sides of the horizontal portions 2b. A shaft 19 is horizontally supported along widthwise direction of the vehicle between the lower ends of the link members 31 and 32. Each collar 18 encircles one end of the shaft 19, and a rubber bush 20 is provided between the collar 18 and the shaft 19, so that each collar 18 is connected to the corresponding link members 31 32.

As shown in FIG. 4, each rubber bush 20 comprises a rubber ring 20a, and inner and outer metal rings 20b and 20c secured to the inner and outer surfaces of the ring 20a, respectively. The inner ring 20b of each rubber bush 20 is fitted over one end of the shaft 19, while the outer ring 20c is fitted within one collar 18, whereby the swing joint 10 is pivotally supported by the rubber bushes 20 on the link mechanism. A tubular spacer 21 is provided between the inner rings 20b of the rubber bushes 20, and is fitted over the shaft 19.

The link mechanism 30 comprises the two transversely spaced apart parallel link members 31 32 suspended from the horizontal portion 2b, and a cylindrical sleeve 33 extending between the upper ends of the link members 31 32 to support the latter. The sleeve 33 is supported by a supporting shaft 23 through rubber bushes 24 provided at the opposite ends of the supporting shaft 23. The shaft 23 extends horizontally between a pair of brackets 22 secured to the frame members 2-1 and 2-2, respectively. Each rubber bush 24 comprises a rubber ring 24a, and inner and outer metal rings 24b and 24c fused to the inner and outer surfaces of the rubber ring 24a, as shown in FIG. 4. A tubular spacer 25 is provided between the inner rings 24b of the rubber bushes 24, and encircles the supporting shaft 23. The inner ring 24b of each rubber bush 24 is fitted over one end of the supporting shaft 23, while its outer ring 24c is fitted within one end of the cylindrical sleeve 33, whereby the link mechanism 30 is pivotally supported on the frame 2 within deformable range of the rubber bushes.

The link members 31 and 32 are swingable about the shaft 23 along travel direction of the vehicle, while the swing joint 10 is pivotable along travel direction of the vehicle about the shaft 19 extending between the link members 31 and 32. Thus the link members 31 and 32, and the rear cushion unit 17 define a substantially parallel link with respect to the joint 10, so that the joint 10 provides high followability along horizontal and vertical directions. As a result, followability and dampering function of the rear frame including the rear wheels 14 is enhanced, to thus promote riding comfort. The link, including the rubber bushes provided therein also damps the vibration of the operating engine.

According to this invention, the link mechanism 30 further includes a pair of flexible stops 36 and 37 mounted on at least one of the horizontal sections 2b of the frame members. According to a preferred embodiment of this invention as shown in FIG. 3a, a pair of supporting members 34 and 35 are positioned at the sleeve 33. As shown in FIGS. 3a and 4 to 7, one supporting member 34 is positioned rearwardly of the sleeve 33. The supporting member 34 extends transversely and rearwardly from the upper end of the link member 31. A flexible stop 36 made of rubber or the like and having V-shaped pointed end is provided on the underside of the supporting member 34. The other supporting member 35 is positioned in front of the sleeve 33 at the other horizontal frame member. The supporting member 35 extends transversely and forwardly from the upper end of the other link member 32. A similar flexible stop 37 is provided on the underside of the supporting member 35. The flexible stops 36 and 37 are positioned on the opposite side of the sleeve 33 along travel direction of the vehicle, and placed onto the upper surfaces of the frame members 2-1 and 2-2, respectively. Instead of having the V-shaped pointed end, the flexible stops 36 and 37 may be of any other shape, such as spherical, semispherical or square, if they are easily deformable.

Figure 3B:
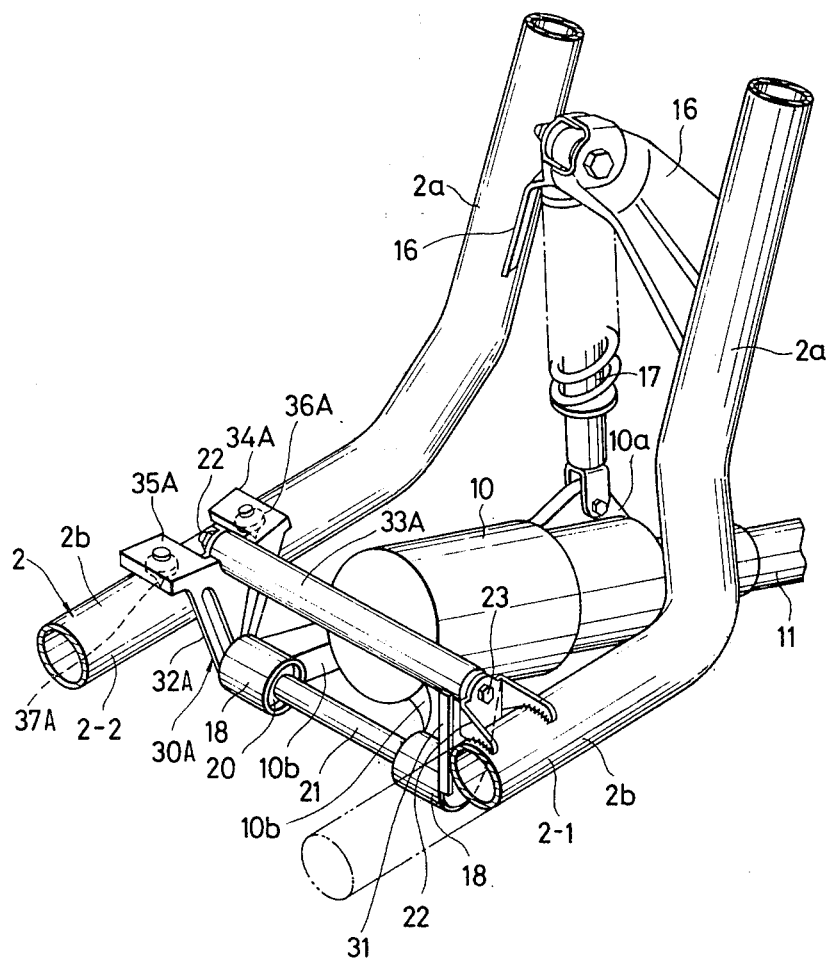
FIG. 3b is a view similar to FIG. 3a but showing a modified embodiment of the invention.
Figure 4:
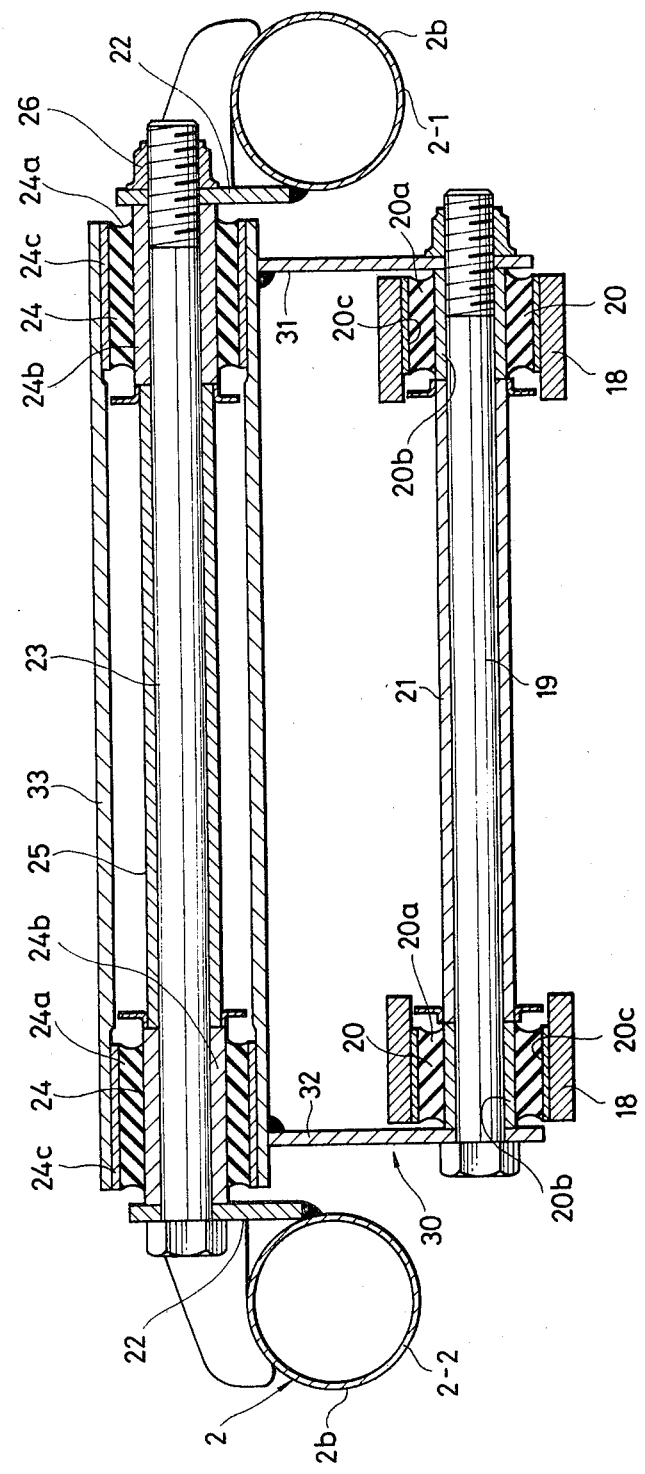
Figure 5:
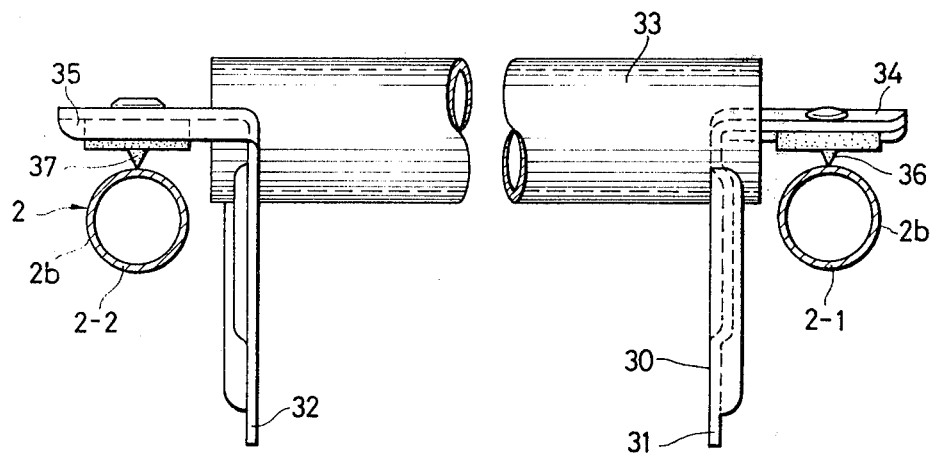
FIG. 5 is a fragmantary front elevational view of the device of this invention shown in FIG. 3.
Figure 6:
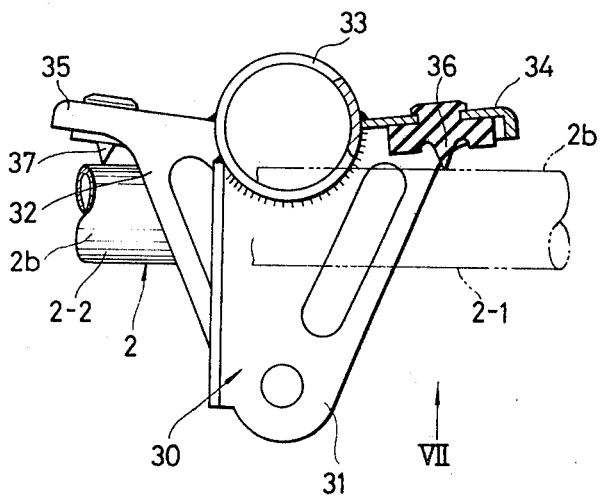
FIG. 6 is a side elevational view, partly in section, of an essential portion of the device shown in FIG. 6.
Figure 7:
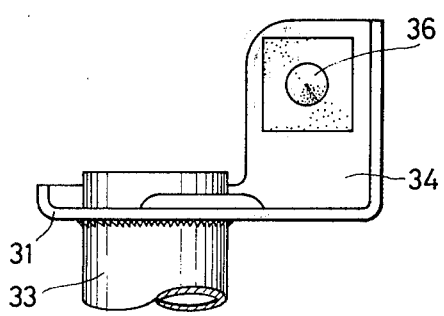
FIG. 7 is a bottom plan view as viewed from an arrow VII of FIG. 6.

Referring now to FIG. 3b, there is shown another embodiment of the invention. A link mechanism 30A comprises a sleeve 33A, and two link members 31A and 32A suspended from the frame members 2-1 and 2-2. The device of this embodiment comprises a pair of supporting members 34A and 35A extending horizontally from the upper end of the one of the link member 32A. The supporting members 34A and 35A extend transversely over one of the frame member 2-2, and are positioned on the opposite side of one end of the sleeve 33A along travel direction of the vehicle 1. The device of this embodiment includes a pair of flexible stops 36A and 37A provided on the undersides of the supporting members 34A and 35A, respectively, and maintained in contact with the upper surface of the frame member 2-2.

Assemblage of the link mechanism will be described. When the sleeve 33 is mounted onto the brackets 22 positioned at the respective frame members 2-1 and 2-2, the stops 36 and 37 are mounted onto the both frame members (FIG. 3a) or the one of the frame members 2-2 (FIG. 3b) in such a manner that the sleeve is positioned between the stops. In this case, the link members 31 and 32 suspended from the frame members 2-1 2-2 upon contact between the V-shaped point of the stops 36 37 and at least one of the frames extend to provide angle relative to the sleeve 33 and the shaft 23, i.e., the link members extend perpendicular to the sleeve or shaft. Accordingly, this vertical orientation of the link members can be immediately provided only by the abutment of the stops onto the frame member. Maintaining this state, the shaft 23 is inserted through the sleeve 33 and is fixedly secured to the brackets 22 by fastening a nut 26. In this case, since the stops 36 and 37 are deformable at their lower ends because of the V-shaped configuration and employment of the flexible material such as rubber, they are easily deformed to absorb or compensate any dimensional deviation generated upon insertion of the shaft 23 through the sleeve 33, to thus automatically provide predetermined orientation of the link members relative to the sleeve 33. Upon completion of the assembly, these stops are easily deformable, and therefore, desirable pivotal movement of the link members is attainable regardless of the provision of the stops.

In view of the foregoing, according to the present invention, position adjustment of the link members, particularly the position adjustment under the vertical suspension of the link members is immediately achievable by the stops upon simple bridging of the sleeve, which is the pivotal support member of the frame side, over the opposing link members. Therefore, the position adjustment is achieved eliminating troublesome control and assembly work. Further, since the stops are formed of flexible material such as rubber, it absorbs or compensates the assembling error or dimensional deviation, to thereby easily and accurately position the link members at suitable orientation within simple assembling work. Furthermore, the resultant structure is simple, to thus realize ecconomical production.

Although the invention has been described with reference to preferred embodiments thereof as employed in a three-wheeled motor vehicle, it is to be understood that modifications or variations may be easily made by anybody of ordinary skill in the art without departing from the scope of this invention which is defined by the appended claims.

What is claimed is:

1. An oscillating link mechanism comprising a pair of parallel spaced apart frame members, a shaft supported by and extending between said frame members, a sleeve rotatably mounted on said shaft between said frame members, link means secured to opposite ends of said sleeve and extending downwardly therefrom and a pair of stops secured to said link means for rotation therewith with one of said stops overlying a frame member on one side of said shaft and the other side overlying a frame member on the opposite side of said shaft to limit rotation of said link means about said shaft in opposite directions.

2. An oscillating link mechanism as set forth in claim 1 wherein one of said stops is secured to said link means at one end of said sleeve for engagement with one of said frame members and the other of said stops is secured to said link means at the opposite end of said sleeve for engagement with the other of said frame members.

3. An oscillating link mechanism as set forth in claim 1 wherein said pair of stops are secured to said link means at one end of said sleeve for engagement with one of said frame members.

4. An oscillating link mechanism as set forth in claim 2 wherein each of said link means is provided with a supporting member integrally connected to the upper end of said link means with each supporting member having a lower surface, each of said stops being secured to each lower surface, respectively, and extending downwardly therefrom.

5. An oscillating link mechanism as set forth in claim 3 wherein a pair of supporting members are integrally connected to an upper end of one of said link means with each of said supporting members having a lower surface, said pair of stops being secured to said lower surfaces of said pair of supporting members and extending downwardly therefrom.

6. An oscillating link mechanism as set forth in claim 1 wherein said stops are formed of rubber.

7. An oscillating link mechanism as set forth in claim 1 wherein said stops have a V-shaped configuration.

8. An oscillating link mechanism as set forth in claim 1 further comprising a pair of brackets mounted on said frame members, said shaft being fixedly secured to said brackets at opposite ends thereof and rubber bushing means interposed between said shaft and said sleeve for concentrically supporting said sleeve on said shaft.

9. An oscillating link mechanism as set forth in claim 4 or 5 wherein each of said supporting members extends perpendicular to said link means and is disposed in a substantially horizontal position overlying one of said frame members with each of said supporting members extending in substantially opposite directions with respect to said sleeve.

10. A three-wheeled motor vehicle including a front body, a rear body, an oscillating link mechanism pivotally connected to said front body, a swing joint having a front end pivotally connected to said link mechanism, a rotary joint having a front end rotatably connected to a rear end of said swing joint, and a rear end connected to said rear body and a rear cushion unit having an upper end connected to said front body and a lower end connected to said swing joint, said front body having a pair of parallel tubular frame members, a portion of which extend horizontally in the direction of travel of said vehicle and said oscillating link mechanism comprises a pair of brackets fixedly mounted on said frame members respectively, a pivot shaft supported at opposite ends by said brackets, a cylindrical sleeve having a pair of link members secured thereto surrounding said shaft between said frame members, rubber bushing means secured to said shaft and said sleeve for concentrically supporting said sleeve for oscillating movement about said shaft within the deformable range of rubber bushing means, a shaft supported by the lower end of said link members with said swing joint being pivotally connected to said shaft, a pair of supporting members each integrally connected to an upper end of a a respective link member and extending in opposite directions from said sleeve above said frame members with one of said supporting members extending rearwardly from one end of said sleeve and the other of said supporting members extending forwardly from the other end of said sleeve and a pair of stops formed of flexible material connected to a lower surface of a respective supporting member and extending downwardly for contact with said frame members.

11. A three-wheeled motor vehicle including a front body, a rear body, an oscillating link mechanism pivotally connected to said front body, a swing joint having a front end pivotally connected to said link mechanism, a rotary joint having a front end rotatably connected to a rear end of said swing joint, and a rear end connected to said rear body and a rear cushion unit having an upper end connected to said front body having a pair of parallel tubular frame members, a portion of which extend horizontally in the direction of travel of said vehicle and said oscillating link mechanism comprises a pair of brackets fixedly mounted on said frame members respectively, a pivot shaft supported at opposite ends by said brackets, a cylindrical sleeve having a pair of link members secured thereto surrounding said shaft between said frame members, rubber bushing means secured to said shaft and said sleeve for concentrically supporting said sleeve for oscillating movement about said shaft within the deformable range of the rubber bushing means, a shaft supported by the lower ends of said link members with said swing joint being pivotally connected to said shaft, a pair of supporting members integrally connected to an upper end of one of said link members and extending in opposite directions with respect to said sleeve above one of said frame members and a pair of stops formed of flexible material with each of said stops being connected to a lower surface of a respective supporting member and extending downwardly for contact with said one of said frame members.

* * * * *